July 18, 1944.   J. V. GIESLER   2,353,889
TEMPERATURE REGULATOR
Filed April 14, 1941
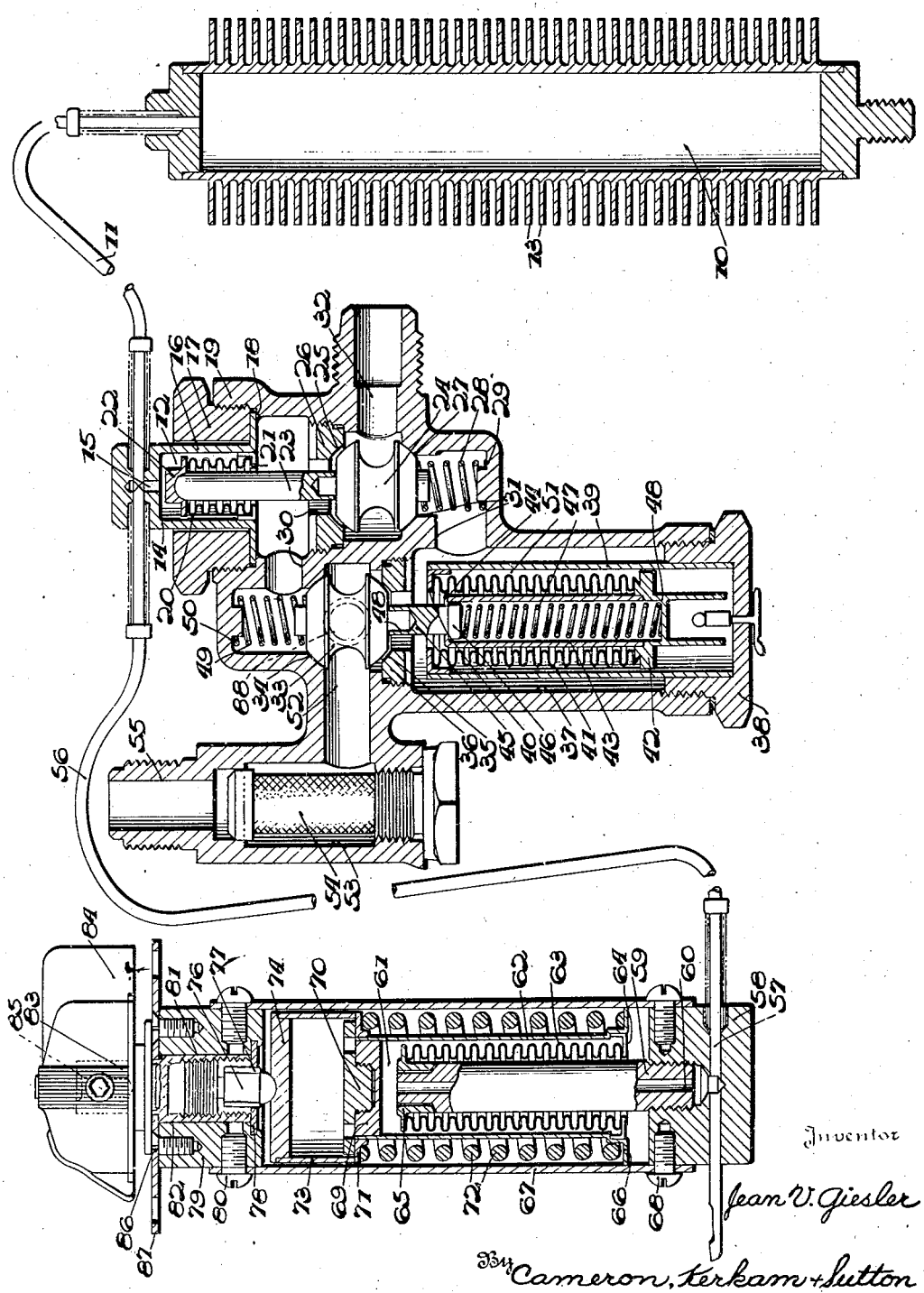
Inventor
Jean V. Giesler
By Cameron, Kerkam + Sutton
Attorneys Patented July 18, 1944

2,353,889

UNITED STATES PATENT OFFICE 2,353,889

TEMPERATURE REGULATOR

Jean V. Giesler, Knoxville, Tenn., assignor to The Fulton Sylphon Company, Knoxville, Tenn., a corporation of Delaware Application April 14, 1941, Serial No. 388,517

5 Claims. (Cl. 236—1)

This invention relates to temperature regulators, and more particularly to a temperature regulator adapted to automatically control the flow of either a heating or a cooling fluid.

If a single thermostatically operated valve is to control the flow of either a heating fluid or a cooling fluid to maintain a desired temperature condition or range its operation in response to the thermostat must be reversed depending upon whether a heating fluid or a cooling fluid is being controlled; i. e., if the valve is operating to control heating fluid an increase in temperature above the temperature to be maintained requires that the valve be moved toward closed position to decrease the quantity of heating fluid being admitted to the heat exchanger, whereas if the valve is controlling a cooling fluid an increase in temperature above that which is to be maintained requires a movement of the valve toward open position to increase the amount of cooling fluid flowing to the heat exchanger.

It is an object of this invention to provide an improved single thermostatically operated valve which is associated with means whereby the aforesaid reversal of operation is effected.

Another object of this invention is to provide a device of the type characterized which operates automatically to effect the desired reversal of operation depending upon whether the system is supplied with a heating medium or a cooling medium.

Another object of this invention is to provide a device of the type characterized which functions to progressively vary the flow of the heating medium or the cooling medium, as the case may be, in order that the valve mechanism may take up that position for predetermining the flow of the medium which corresponds with the maintenance of the desired temperature and thereby avoids the intermittent operation characteristic of a valve which moves from wide open to fully closed position, or vice versa, at each action, with the consequent disadvantages incident to that character of control of the flow of a heating medium or a cooling medium.

Another object of this invention is to provide a device of the type characterized which may be readily and accurately adjusted to predetermine the temperature to be maintained so that close modulation may be effected.

Another object of this invention is to provide a device of the type characterized wherein ample provision is made for overrun if the temperature continues to rise after a valve member has engaged its seat and thereby prevent injury through development of excessive pressures.

Another object of this invention is to provide a device of the type characterized which is easy to adjust, simple in character, inexpensive to manufacture and install, and certain in operation.

Other objects of the invention will appear as the description thereof proceeds.

The invention is capable of receiving a variety of mechanical expressions one of which is illustrated on the accompanying drawing, but it is to be expressly understood that the drawing is for purposes of illustration only, and is not to be construed as a definition of the limits of the invention, reference being had to the appended claims for that purpose.

The drawing shows in elevation and somewhat schematically an embodiment of the present invention, it being expressly understood that the relationship shown between the parts of the structure connected by tubing has been selected merely for convenience of illustration.

As shown, the embodiment of the present invention selected for explanation of the invention consists of two thermostatically operated valve mechanisms so related that one predetermines the direction of flow of the medium under control through the other, the latter determining the quantity of medium flowing to the heat exchanger and including a temperature responsive bulb, which may be disposed at any suitable distance and at any suitable location and relationship with respect to its valve mechanism, and means for adjusting the operation and response of said valve mechanism, which also may be located at any suitable distance and at any suitable location and relationship with respect to both said bulb and said valve mechanism. Both thermostats are preferably of the liquid expansion type.

In the embodiment illustrated the thermostatically operated valve mechanism for determining the quantity of medium flowing to the heat exchanger includes a bulb 10 connected through any suitable piping, such as a capillary tube 11, with an expansible and collapsible chamber or motor vessel 12. Bulb 10, tube 11 and vessel 12 are filled with any suitable thermosensitive medium, preferably a liquid. Bulb 10 may be of any suitable size, construction and material, being shown as provided with circumferentially extending ribs 13 so that it may be subjected to the ambient of a room or other compartment whose temperature is to be controlled and be sensitively responsive to variations in temperature thereat. Tube 11 is secured in any suitable way to one end of said bulb, and at its opposite end tube 11 is connected in any suitable way to a housing member 14 in communication with a passage 15 leading to said chamber 12. Housing member 14 has a tubular wall 16, and at its inner end it is appropriately flanged and retained by a nut 17 on a shoulder 18 provided in the casing 19. Chamber 12 has its outer wall formed by said tubular wall 16 and its inner wall formed by an expansible and collapsible corrugated tubular metal wall or bellows 20 having one end suitably secured to a flange 21 formed on or fixedly attached to wall 16 and its opposite end suitably secured to a movable end wall 22.

End wall 22 is engaged with the stem 23 of a double seating valve member 24 adapted to cooperate at one face with a ported seat 25, here shown as formed on a ring 26 suitably secured in the casing, and at its opposite face with a ported seat 27, here shown as formed on an inner wall of the casing. Cooperating with said valve member 24 is a coil spring 28 which reacts between said valve member and a seat 29 formed on the casing, said spring reacting between said seat and said valve member to hold the stem 23 continuously in engagement with the movable head 22 of the bellows 20.

Casing 19 is provided interiorly and in any suitable way with passages 30 and 31 leading to the valve seats 25 and 27 respectively and adapted to be placed in communication through the valve ports with an outlet passage 32 leading to any suitable heat exchanger disposed at any suitable distance and location and relationship with respect to the casing 19.

The determination as to whether the medium under control shall flow through the passages 30 or 31 is effected by the second thermostatically controlled valve mechanism referred to and which includes a double seating valve member 33 cooperating with opposed ported valve seats 34 and 35, the former being shown as formed on an inner wall of the casing 19 and the latter being shown as formed on a ring 36 secured in the casing 19 in any suitable way. The port in seat 34 is in communication with the passages 30, and the port in seat 35 is in communication with the passages 31 through the thermostatic chamber 37 formed in a tubular extension on the casing 19. Mounted in said chamber 37, and preferably carried by a closure member 38 threaded into the end of said chamber, is a thermostatic device including a fixed tubular wall 39 secured in a recess of said closure member and having at its opposite end a flange 40 formed thereon or suitably attached thereto and to which is suitably secured one end of an expansible and collapsible tubular corrugated metal wall or bellows 41 whose opposite end is suitably secured to a movable end wall 42. Projecting interiorly of said bellows 41 from said end wall 42, and mounted on or suitably attached to said end wall 42 is a tubular wall 43 flanged at its free end 44. Slidably mounted in the aperture of said flange 44 is a valve stem 45 having a head 46 that is normally held in engagement with said flange 44 by a coil spring 47 reacting between said head 46 and a suitable spring seat 48 provided on the movable head 42. Valve stem 45 has suitable engagement with the valve member 33 as shown at 48 and said valve member is held in engagement with said valve stem 45 by a coil spring 49 reacting between said valve member 33 and a suitable seat 50 provided in the casing 19. The expansible and collapsible chamber 51 defined exteriorly by the tubular wall 39 and defined interiorly by the bellows 41 is filled with a suitable liquid which is in heat interchanging relationship with the fluid in chamber 37 and also in heat conducting relationship with the metal walls of the fluid passages to be described.

Leading to the valve seats 34 and 35 is a suitable passage 52 formed in the casing 19 and which communicates with a filter chamber 53 in which is disposed a filter 54 of suitable form and construction, the inlet to said filter chamber being through passage 55 which may communicate with any suitable sources of heating and cooling medium provided with suitable valves for determining whether the heating medium or the cooling medium shall flow through said inlet passage 55.

The first described thermostatically operated valve mechanism for determining the quantity of medium flowing to the heat exchanger is preferably provided with mechanism for adjusting the same so as to predetermine the temperature to be maintained thereby. To this end, as shown, the passage 15 in the housing member 14 is also in communication through any suitable piping, as a capillary tube 56, with a passage 57 in a block 58 which may be mounted at any suitable distance from and at any suitable location and relationship to the casing 19. Block 58 has formed thereon or suitably attached thereto a post 59 containing an axially extending passage 60 which communicates with said passage 57 and also with an expansible and collapsible chamber 61 whose outer wall is defined by tubular wall 62 and whose inner wall is defined by an expansible and collapsible corrugated tubular metal wall or bellows 63 fixedly secured in any suitable way, at one end, to a flange 64 formed on or suitably attached to said wall 62, and fixedly secured at its opposite end, in any suitable way, to a head 65 formed on or suitably secured to the inner end of post 59. Wall 62 has formed thereon or suitably attached thereto an outwardly extending flange 66 slidably mounted in a tubular housing wall 67 mounted on the block 58 and attached thereto in any suitable way as by one or more screws 68. The opposite end of tubular wall 62 is hermetically closed by a block 69 here shown as provided with a threaded recess in which is received a flanged head 70. Slidably mounted on the tubular wall 62 is a ring 71 which is normally held in contact with the flanged head 70 by coil spring 72 reacting between said ring 71 and the flange 66. Ring 71 is formed on or suitably attached to a tubular member 73 here shown as attached to a head 74 engaged with the end of a stud 76 provided with splines 77 that engage in slots in a plate 78 secured to a second block 79 to which the tubular wall 67 is also attached as by one or more screws 80. Stud 76 has a threaded head 81 which cooperates with threads in a surrounding rotatable sleeve 82 that has a post 83 projecting exteriorly of the block 79 and on which is mounted a knob 84 for rotating the sleeve 82. Knob 84 may be suitably attached to the stud 83 as by splines and a set screw 85. Block 79 is attached, as by screws 86, to a mounting plate 87, and if desired knob 84 and said mounting plate 87 may be suitably provided with a pointer and a dial or other indicia to facilitate the setting of the knob 84.

The expansible and collapsible chamber 61 and its communicating passages 60, 57 and the tube 56 are filled with the same liquid that fills the expansible and collapsible chamber 12, the bulb 10 and the tube 11.

If the medium to be controlled should remain stagnant in the passages 52, 53 and 55, it would gradually acquire the temperature of the surrounding atmosphere to which the casing 19 is subjected, and inasmuch as suitable operation of the thermostat including the expansible and collapsible chamber 51 involves the conduction of heat thereto from the fluid in the passage 52, said thermostat would not properly respond if the temperature in the passage 52 became that of the ambient rather than that of the medium under control. Accordingly the passage 52 is provided with a bleeder opening 88 (shown in dotted lines) in communication with any suitable part of the system for returning same of the medium to the inlet passage 55 so that a slow circulation is maintained through the passage 52 and said passage is subjected to the temperature of the medium under control at all times, whereby heat flow through the casing wall to or from the wall of chamber 37 will cause the thermostat which includes the expansible and collapsible chamber 51 to respond to the temperature of the medium in passage 52.

In operation, and assuming that the bulb 10 is suitably mounted so as to be responsive to variations in temperature in the room or other compartment in which the temperature is to be controlled, and further assuming that a source of heating medium has been put in communication with the inlet passage 55, said heating medium may flow through the inlet passage 55, filter chamber 53, passage 52, past valve seat 35 to chamber 37, and thence through passages 31 to valve seat 27. The heating medium in chamber 37 maintains the thermostat including expansible and collapsible chamber 51 in its relately expanded condition holding valve member 33 against its seat 34 and preventing flow of the medium through the passages 30 to valve seat 25. Valve member 24 as shown is in contact with its seat 27, preventing flow of the heating medium to the outlet passage 32 and thence to the heat exchanger, which is the position assumed by the parts when the temperature in the room or other compartment has reached the maximum desired temperature. If the temperature in said room or other compartment decreases the liquid in bulb 10 responds to the decreasing temperature and by contraction permits contraction of the expansible and collapsible chamber 12. Valve member 24 is thereby moved from its seat 27 by the spring 28 so that heating medium may flow past the seat 27 to the outlet 32. Valve 24 will move away from its seat 27 until the quantity of heating medium supplied to the heat exchanger establishes the desired temperature. If the temperature increases the liquid in bulb 10 expands and expands chamber 12 to move valve member 24 back toward its seat 27, ultimately engaging said seat and discontinuing the flow of heating medium if the maximum desired temperature is again reached. It will be noted that the valve member 24 in this relationship of the parts moves toward its seat to decrease heating medium flow as the temperature rises, and moves away from the seat to increase heating medium flow as the temperature decreases, as is proper for the control of a heating medium.

Now assume that the inlet passage 55 is placed in communication with a source of cooling medium. The cooling medium, whether acting directly through the contents of chamber 37 or by heat conduction through the casing walls, causes a contraction of the expansible and collapsible chamber 51, moving the valve chamber 33 into contact with its seat 35 and opening the port of valve seat 34 leading to passages 30 and valve seat 25. Under these conditions the valve member 24, in its position as shown in the drawing, would permit maximum flow of the cooling medium past seat 25 to the outlet passage 32. As the temperature in the room or compartment containing the bulb 10 decreases the liquid in bulb 10 contracts, effecting a contraction of chamber 12 and thereby moving valve member 24 toward its seat 25 to decrease the flow of cooling medium until the valve member assumes that position at which the desired temperature is maintained. If the temperature in the room or other compartment continues to decrease valve member 24 will ultimately engage seat 25 and cut off the flow of cooling medium. If the temperature in the room or other compartment rises, the liquid in bulb 10 expands, expanding chamber 12 and moving valve member 24 off its seat 25. In this relationship of the parts it will be observed that the valve member is moved away from its seat to increase the flow of cooling medium upon increase in temperature at the bulb 10, and is moved toward its seat to decrease the flow of cooling medium on decrease of temperature at the bulb 10, as is proper when the thermostatically operated valve is controlling the flow of a cooling medium.

The temperature to be maintained by the aforesaid operation of the thermostatically operated valve mechanism may be nicely predetermined by the rotating the knob 84 which, by reason of the threaded cooperation between the sleeve 82 and the head 81 causes rectilinear movement of the stud 76, rotation of the latter being prevented by the splines 77. Thereby movement is transmitted, in one direction or the other, to the slidably mounted unit composed of head 74, tubular wall 73, ring 71, spring 72, flange 66, and tubular wall 62 with its block 69 and flanged head 70, to apply pressure to or release pressure from the liquid in chamber 61 so that, by contraction or expansion of the bellows 63, liquid may be forced from or withdrawn into said chamber 61 through passages 60 and 57 and tube 56 to cause chamber 12 to increase or decrease in volume and thereby move the valve member 24 with respect to its seats to cause an earlier or later engagement therewith with variations of temperature at the bulb 10.

If the liquid in bulb 10 should continue to expand after the valve member 24 has engaged its seat, the expansion is transmitted through tube 56 and passages 57 and 60 to chamber 61, whereby the unit composed of tube 62, bellows 63, block 69 and head 70 may move upwardly, as viewed in the figure, bellows 63 being contracted and flanged head 70 moving away from ring 71, against the tension of spring 72, until such time as expansion of the liquid has ceased. Thereby an overrun is provided which assures that the parts will not be injured by the development of an excessive pressure in the liquid. Similarly if the liquid charge in expansible and collapsible chamber 51 should continue to increase in temperature after the valve member 33 has engaged its seat, the pressure applied to movable head 42 may cause continued expansion of the chamber 51, against the tension of spring 47, the tubular wall 43 sliding on the stem 45 away from the head 46 until such time as further expansion of the liquid ceases. If the liquid in either of the thermostats continues to contract after a valve member engages its seat the one-way connection between each valve member and its thermostat permits relative movement therebetween as is apparent.

It will therefore be perceived that by the present invention a temperature regulator has been provided whereby the valve mechanism for predetermining the flow of either a heating or a cooling medium may be properly conditioned so as to move in proper direction with respect to its seat depending upon which medium is to be controlled, and this is effected automatically when the medium is introduced into the system. The valve mechanism so provided varies its position progressively to adjust the flow to maintain the desired temperature without the disadvantages incident to a valve operation wherein the valve moves from wide open to fully closed position, or vice versa, and moreover means have been provided whereby the temperature to be maintained may be nicely predetermined by readily operable adjusting mechanism. The regulator furthermore assures that increase in temperature after a valve member has engaged its seat shall not be productive of destructive pressures within the regulator. The regulator is relatively simple in construction, easy to install and adjust, inexpensive to produce, and highly efficient in operation.

While the embodiment of the invention illustrated on the drawing has been described with considerable particularity it is to be expressly understood that the invention is not restricted thereto, as the same may take a variety of mechanical expressions, some of which will now readily suggest themselves to those skilled in the art, while changes may be made in the details of construction, arrangement and proportion of parts, and certain features used without other features, without departing from the spirit of the invention. Reference is therefore to be had to the appended claims for a definition of the invention.

What is claimed is:

1. In a temperature regulator for controlling the flow of either a cooling medium or a heating medium to a heat exchanger, the combination of a valve member, a pair of ported valve seats with which said valve member is adapted to cooperate, a thermostat subjected to the temperature to be controlled and operatively connected to said valve member, means responsive to the temperature of the medium flowing into the regulator for determining whether said medium shall flow to one or the other of said valve seat ports, and means including a bleeder opening adjacent said last named means for maintaining a continuous flow of said medium past said temperature responsive means to assure response of the latter upon a change in the temperature of said medium.

2. In a temperature regulator for controlling the flow of either a cooling medium or a heating medium to a heat exchanger, the combination of a valve member, a pair of ported valve seats with which said valve member is adapted to cooperate, a thermostat subjected to the temperature to be controlled and operatively connected to said valve member, means responsive to the temperature of the medium flowing into the regulator for determining whether said medium shall flow to one or the other of said valve seat ports, and an expansible and collapsible chamber in communication with said thermostat and means for operating the same to adjust the temperature at which said thermostat responds to the temperature to be controlled, said chamber being telescopically movable with respect to said last named means for relieving pressure on said thermostat if the temperature at said thermostat continues to rise after said valve member has become seated.

3. In a temperature regulator of the type for controlling the flow of either a cooling medium or a heating medium to a heat exchanger which includes a valve member, a pair of ported valve seats with which said valve member is adapted to cooperate, a thermostat subjected to the temperature to be controlled and operatively connected to said valve member and a second thermostatically operated valve member for predetermining whether the flow of medium shall be to one or the other of said ported valve seats, means for adjusting the temperature at which said first named thermostat responds to the temperature to be controlled including an expansible and collapsible reservoir for the thermosensitive liquid with which said thermostat is charged and disposed exteriorly of but in communication with said thermostat and comprising a tubular wall, a corrugated expansible and collapsible wall arranged coaxially therein and forming therewith a chamber for said liquid, and means for moving said cylindrical wall telescopically with respect to said corrugated wall to vary the volume of said chamber.

4. In a temperature regulator of the type for controlling the flow of either a cooling medium or a heating medium to a heat exchanger which includes a valve member, a pair of ported valve seats with which said valve member is adapted to cooperate, a thermostat subjected to the temperature to be controlled and operatively connected to said valve member and a second thermostatically operated valve member for predetermining whether the flow of medium shall be to one or the other of said ported valve seats, means for adjusting the temperature at which said first named thermostat responds to the temperature to be controlled including an expansible and collapsible reservoir for the thermosensitive liquid with which said thermostat is charged and disposed exteriorly of but in communication with said thermostat and comprising a tubular wall, a corrugated expansible and collapsible wall arranged coaxially therein and forming therewith a chamber for said liquid, a member slidably mounted on the exterior of said tubular wall, a flange on said tubular wall, resilient means surrounding said tubular wall normally holding said member in engagement with said flange, the opposite end of said tubular wall being provided with an abutment for said spring, and means operating on said member, and through said resilient means on said tubular wall, to move the latter telescopically with respect to said corrugated wall and vary the volume of said chamber.

5. In a temperature regulator of the type for controlling the flow of either a cooling medium or a heating medium to a heat exchanger which includes a valve member, a pair of ported valve seats with which said valve member is adapted to cooperate, a thermostat subjected to the temperature to be controlled and operatively connected to said valve member and a second thermostatically operated valve member for predetermining whether the flow of medium shall be to one or the other of said ported valve seats, means for adjusting the temperature at which said first named thermostat responds to the temperature to be controlled including an expansible and collapsible reservoir for the thermosensitive liquid with which said thermostat is charged and disposed exteriorly of but in communication with said thermostat and comprising a tubular wall, a corrugated expansible and collapsible wall arranged coaxially therein and forming therewith a chamber for said liquid, a member slidably mounted on the exterior of said tubular wall, flanges disposed at the opposite extremities of said tubular wall, a coil spring surrounding said tubular wall and reacting between one of said flanges and said member to hold said member against the other of said flanges, said tubular wall being telescopically movable with respect to said member against the tension of said spring to increase the volume of said chamber upon increase of pressure therein, and means cooperating with said member and acting through said spring to move said tubular wall telescopically with respect to said corrugated wall and vary the volume of said chamber.

JEAN V. GIESLER.